Patented Feb. 12, 1935

1,990,896

UNITED STATES PATENT OFFICE 1,990,896

METHOD OF MAKING POTASSIUM SULPHATE

George A. Connell, San Pedro, Calif., assignor to Pacific Coast Borax Co., a corporation of Nevada No Drawing. Application July 30, 1932, Serial No. 627,110. Renewed July 2, 1934

7 Claims. (Cl. 23—121)

This invention has to do in a general way with the production of potassium sulphate ($K_2SO_4$) and is more particularly related to a process for forming potassium sulphate by the chemical reaction of sodium sulphate decahydrate or Glauber's salt with potassium chloride.

It is a primary object of this invention to produce a process as described above which may be practiced at a minimum cost with a very high recovery of commercially pure potassium sulphate. It is well known to those familiar with the art that sodium sulphate and potassium chloride in solution will react according to the following equations:

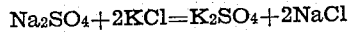

$$Na_2SO_4 + 2KCl = K_2SO_4 + 2NaCl$$

It is also a well known fact that when sodium sulphate decahydrate or Glauber's salt reacts with potassium chloride, there is in the resultant system or solution a double salt known as glaserite which is the double sulphate of sodium and potassium and has been given the formula of $K_3Na(SO_4)_2$. Under normal temperature conditions or 25° C. or above, a chemical system containing the above compounds will contain as a solid phase, a mixture of glaserite, potassium sulphate, potassium chloride, and sodium chloride in various proportions, depending upon the ratio which these compounds bear to each other in the solution. This condition is apparent from the phase rule diagram of this system, an example of which may be found in the International Critical Tables, volume 4, page 383, in Fig. 27.

For example, if a saturated solution of sodium sulphate is added to a saturated solution of potassium chloride at a temperature of 25° C. or higher, a minute quantity of potassium sulphate or glaserite will be precipitated in the solid form. In order to get a further yield of solids, the logical procedure is to evaporate the solution and if the solution is evaporated at any workable temperature of 25° C. or higher, a mixture of glaserite, potassium sulphate, potassium chloride or sodium chloride, or potassium chloride and sodium chloride is precipitated. Such a mixture of salts obviously has no commercial value. If, on the other hand, the temperature of the solution is reduced to, say, 0° C. as will appear from Fig. 26 of the International Critical Tables referred to above (page 383) the solid phase is composed of potassium sulphate. The refrigeration of the solution in order to obtain such precipitation is an expensive procedure and for this reason, so far as I am aware, the reaction of Glauber's salt and potassium chloride has never been utilized in a commercial way for the production of potassium sulphate.

It is a well known fact to those familiar with the art that the solution of most neutral salts is an endothermic process. This is especially true of potassium chloride and sodium sulphate decahydrate, both of which have a very high negative heat of solution. In other words, if water is added to either of these salts in substantially a dry state in sufficient quantity to dissolve them, the temperature of the solution is reduced substantially 30° C. The essence of my invention resides in taking advantage of this fact to obtain the low temperature of a solution or system of the type described above at which commercially pure potassium sulphate will be precipitated. In other words instead of obtaining the reaction by mixing a solution of sodium sulphate decahydrate with a solution of potassium chloride and cooling the resultant solution by refrigeration, I obtain the low temperature necessary by either adding water to a mixture of the dry salts in the proper proportion, or by adding a solution of either one of the salts to the other salt in a dry state, or by forming one or both solutions by adding water to the corresponding dry salt and immediately mixing the two solutions in insulated vessels so that the low temperature obtained during the dissolving process is maintained over a sufficient period of time to permit the precipitation and recovery of the potassium sulphate.

As a specific example, I take a mixture consisting of forty-two parts of potassium chloride and forty parts of Glauber's salt (sodium sulphate decahydrate) and dissolve the same in one hundred parts of water, all of the ingredients being at atmospheric temperature, say, 25° C. The temperature of the mixture or solution as the salts dissolve drops to substantially 4° below zero, and commercially pure potassium sulphate (substantially 96% $K_2SO_4$) precipitates and can be recovered by decanting or filtration. By carrying out the process in this manner, I have found that the potassium content of the recovered salt amounts to 40% of the total amount present in the original solution. Furthermore, I have found that so much of the sulphate ion has been removed from solution that after filtering, the resulting solution can be evaporated at a high temperature to give a very clean separation of potassium chloride, by methods well known in the art. The potassium chloride recovered in this manner can be added to additional Glauber's salt for repeating the cycle.

Although in the specific example given above, I describe the water as being added to the mixture of the two salts, it is to be understood that in actual practice the water can be added to either one of the two salts and the other salt added to the solution thus formed providing the solution is insulated in a manner which does not permit a material increase in temperature.

I have found in the practice of the process that the yield of potassium sulphate varies somewhat with the purity of the reacting salts but that it is possible to obtain pure potassium sulphate with impure potassium chloride such as the commercial muriate of potash or an even lower grade material.

It is to be understood that while I have given, in the example above, a specific ratio of the ingredients which I have found to be preferable for the maximum efficiency, the invention is not limited to such proportions but includes within its scope whatever changes fairly come within the spirit of the appended claims.

I claim as my invention:

1. The process of forming potassium sulphate by the chemical reaction of potassium chloride and sodium sulphate decahydrate which includes adding water to a substantially dry mixture of said salts.

2. The process of forming potassium sulphate by the chemical reaction of potassium chloride and sodium sulphate decahydrate which includes dissolving substantially dry potassium chloride in a solution of sodium sulphate.

3. The process of forming potassium sulphate by the chemical reaction of potassium chloride and sodium sulphate decahydrate which includes dissolving substantially dry sodium sulphate decahydrate in a solution of potassium chloride.

4. The method of obtaining potassium sulphate by the chemical reaction of sodium sulphate decahydrate with potassium chloride which includes dissolving one of said salts in water to obtain a low temperature solution and maintaining such temperature during the reaction of said solution with a solution of the other salt.

5. The process of forming potassium sulphate by the chemical reaction of potassium chloride and sodium sulphate decahydrate which utilizes the negative heat of solution of one of the reacting salts to obtain the low temperature necessary for precipitating the potassium sulphate.

6. The process of forming potassium sulphate by the chemical reaction of potassium chloride and sodium sulphate decahydrate which includes: adding water to a substantially dry mixture of said salts to obtain a solution of low temperature by virtue of the negative heats of solution of said salts; maintaining the low temperature obtained by preventing undue reabsorption of heat, thereby precipitating potassium sulphate; and separating the potassium sulphate from the solution while said low temperature is maintained.

7. The process of forming potassium sulphate by the chemical reaction of potassium chloride and sodium sulphate which includes: adding water to a substantially dry mixture of said salts under heat insulated conditions thereby utilizing the negative heat of solution of said salts to obtain and maintain a temperature of substantially 0° C. to effect the precipitation of potassium sulphate from solution; and separating the potassium sulphate from the solution while said low temperature is maintained.

GEORGE A. CONNELL.